United States Patent [19]

Wilken

[11] 4,053,658

[45] Oct. 11, 1977

[54] METHOD FOR TREATING MUSHROOMS

[76] Inventor: Verne E. Wilken, 601 S. Dixie Highway, Lot 38, Stuart, Fla. 33494

[21] Appl. No.: 748,900

[22] Filed: Dec. 9, 1976

[51] Int. Cl.$^2$ .............................................. A23L 1/212
[52] U.S. Cl. .................................................. 426/615
[58] Field of Search ............... 426/302, 310, 321, 615, 426/441

[56] References Cited

U.S. PATENT DOCUMENTS 1,018,909   2/1912   Jacob ..................................... 426/302
3,700,467  10/1972   Di Cecco .............................. 426/615

Primary Examiner—Raymond N. Jones
Assistant Examiner—R. A. Yoncoskie
Attorney, Agent, or Firm—Frederick L. Bergert

[57] ABSTRACT

A method for treating mushrooms in order to preserve and clean them and to improve their flavor is disclosed. The method includes soaking of the mushrooms in an edible vegetable oil such as soybean oil. After the soaking step, the mushrooms are water rinsed to clean and to remove excess oil, and then allowed to dry. As an alternative, a source of air under pressure may be used to clean the mushrooms and remove excess oil. Mushrooms treated in accordance with the present invention have been found to maintain a fresh condition for much longer periods of time than untreated mushrooms, and with a definite improvement in the flavor thereof.

8 Claims, No Drawings

METHOD FOR TREATING MUSHROOMS

BACKGROUND AND SUMMARY OF THE INVENTION

The present invention relates to a method for treating mushrooms. More particularly, the present invention relates to a method for treating mushrooms, in order to preserve and clean them and to improve their flavor, by soaking the mushrooms in an edible vegetable oil such as soybean oil.

Previous methods for treating mushrooms for purposes of preservation have included, for example, such processes as those described in U.S. Pat. Nos. 1,018,909, 3,658,554 and 3,857,979. In the method as described in U.S. Pat. No. 1,018,909, for example, there is provided a complex series of steps including evaporation of part of the water content of the mushrooms, dipping of the mushrooms in hot cottonseed or olive oil and various heating steps.

By the present invention, there is provided an improved method of the treatment of mushrooms, which method has been found to markedly increase the length of time over which the mushrooms may be preserved in a fresh condition. In addition, a definite improvement has been noted in the flavor of mushrooms treated in accordance with the present invention. The method of the present invention includes soaking of the mushrooms in an edible vegetable oil such as soybean oil. The soaking step is followed by rinsing clean in water and air drying of the mushrooms or, alternatively, by applying a source of air under pressure to clean the mushrooms and remove excess oil.

DESCRIPTION OF THE PREFERRED EMBODIMENTS

The procedure which results in the improved method for treating mushrooms in accordance with the present invention includes: (1) allowing the mushrooms to soak in the edible vegetable oil for a time period sufficient for the oil to be absorbed into the tissues of the mushrooms; (2) a water rinse treatment to clean the mushrooms by means of a water spray or other suitable water rinsing means; and (3) allowing the mushrooms to air dry. An air cleaning step using air under pressure may be employed as an alternative to steps (2) and (3).

The oil soaking step in the present mushroom treatment may be carried out with any of the various edible vegetable oils, such as soybean oil, corn oil, cottonseed oil or peanut oil, for example.

In carrying out the method of the present invention, freshly harvested mushrooms are placed in a suitable container containing the edible vegetable oil and permitted to soak for a period of time sufficient to allow the mushrooms to absorb oil into their tissues. Generally, this time period will be on the order of from about 30 minutes to about 60 minutes. While some of the desired effect may be obtained by shorter soaking periods, generally soaking for shorter periods does not allow sufficient time for the vegetable oil to be adequately absorbed by the mushrooms. The mushrooms have a tendency to float in th vegetable oil, and they will soak up or absorb an amount of oil which separates dirt from the mushrooms, thus allowing the mushrooms to be easily cleaned.

At the end of the soaking period, the mushrooms are then subjected to a water rinse step to clean them. This may be carried out by placing the mushrooms on a flat, perforated surface, for example, and spraying the mushrooms with water for a short time in order to remove accumulations of soil and the vegetable oil on the surfaces of the mushrooms. Soaking of the mushrooms in water is to be avoided, as this will tend to spoil the appearance and reduce the flavor of the mushrooms, and will also tend to make the soil cling to the mushrooms. Upon completion of the water rinse step, the mushrooms may then be placed upon any suitable flat surface and allowed to dry. Alternatively, after the oil soaking step, the mushrooms may be subjected to a source of air under pressure, such as air from an air pressure hose, for example, for a short period of time, sufficient to clean and dry the mushrooms while blowing off accumulations of the oil.

It has been found, as a result of carrying out the method as described hereinabove, that the treated mushrooms will keep for much longer periods than do untreated mushrooms, on the order of twice as long or in extremely good condition for one week. The appearance of such treated mushrooms is also enhanced, compared to the appearance of untreated mushrooms. Mushrooms treated in accordance with the present invention may be made up into an attractive fresh pack of mushrooms, ready for garnishes, salads and flavoring. Alternatively, such treated mushrooms may be frozen for subsequent storage, in accordance with conventional procedures. Such frozen mushrooms must be used immediately after thawing to avoid discoloration of the mushrooms.

In consuming mushrooms which have been treated in accordance with the present invention, the mushrooms may be consumed whole, or sliced or quartered, and salt or other seasoning added as desired. In any case, whether additional seasoning is added or not, there has been found to be a remarkable improvement in the flavor and taste of the mushrooms after treatment as described hereinabove.

The present method is applicable to any of the various species of mushrooms. For best results, the mushrooms should be treated by the present method on the same day they are picked or harvested, or at least within a period of approximately 24 hours after such harvesting.

It is thought that the invention and many of its attendant advantages will be understood from the foregoing description, and it will be apparent that various changes may be made in the method as described herein without departing from the spirit and scope of the invention or sacrificing its material advantages, the forms hereinbefore described being merely preferred embodiments thereof.

It is claimed:

1. A method for cleaning and preserving mushrooms and improving the flavor thereof, which comprises:
   a. soaking at least one mushroom in an edible vegetable oil for a time period sufficient for the oil to be absorbed into the tissues of the mushroom;
   b. subjecting the mushroom to a water rinse step to remove accumulations of soil and the vegetable oil on the surface of the mushroom; and
   c. allowing the mushroom to dry.

2. The method of claim 1 which comprises soaking the mushroom in the vegetable oil for a time period of about 30 minutes to about 60 minutes.

3. The method of claim 1 wherein said vegetable oil is soybean oil.

4. A mushroom prepared by the method of claim 1.

5. A method for cleaning and preserving mushrooms and improving the flavor thereof, which comprises:

a. soaking at least one mushroom in an edible vegetable oil for a time period sufficient for the oil to be absorbed into the tissues of the mushroom; and b. subjecting the mushroom to air under pressure in order to clean and dry the mushroom while removing accumulations of oil.

6. The method of claim 5 which comprises soaking the mushroom in the vegetable oil for a time period of about 30 minutes to about 60 minutes.

7. The method of claim 5 wherein said vegetable oil is soybean oil.

8. A mushroom prepared by the method of claim 5.